Figure 1:
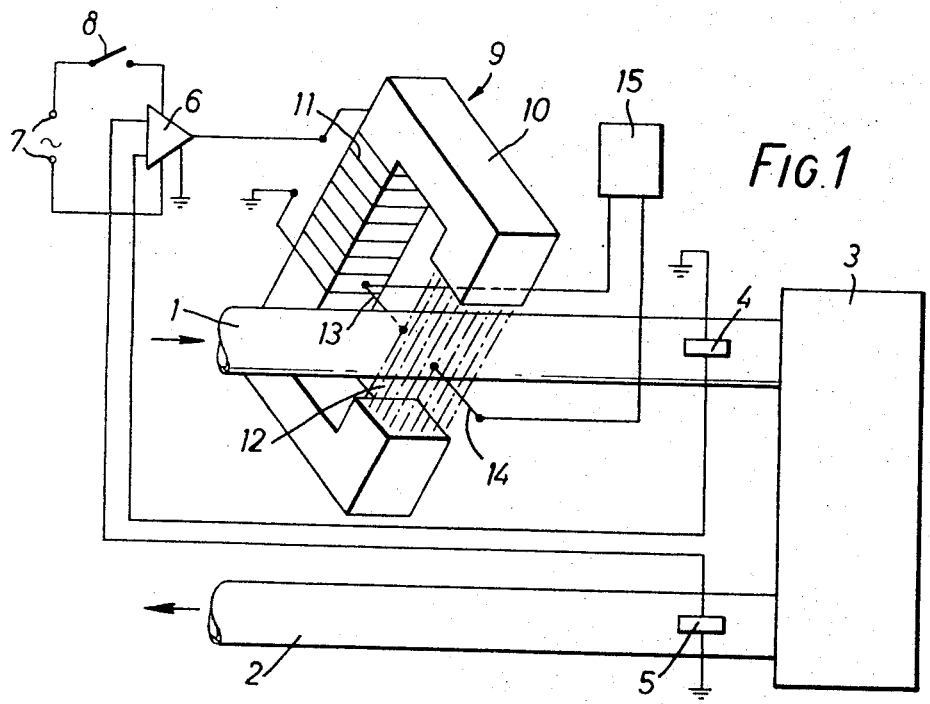

United States Patent [19]
Iversen

[11] 3,842,669
[45] Oct. 22, 1974

[54] APPARATUS FOR MEASURING QUANTITIES OF HEAT USED IN HOT-WATER HEATING INSTALLATIONS

[75] Inventor: Poul Christian Carlos Iversen, Nordborg, Denmark

[73] Assignee: Danfoss A/S, Nordborg, Denmark

[22] Filed: Mar. 8, 1973

[21] Appl. No.: 339,183

[30] Foreign Application Priority Data
Mar. 22, 1972 Germany............................ 2213760

[52] U.S. Cl. ........................... 73/193 R, 73/194 EM
[51] Int. Cl. ............................................ G01r 17/16
[58] Field of Search .................... 73/193 R, 194 EM

[56] References Cited
FOREIGN PATENTS OR APPLICATIONS
1,228,922   9/1960   France ................................. 73/193

Primary Examiner—Herbert Goldstein

[57] ABSTRACT

The invention relates to apparatus for measuring quantities of heat used in hot water heating installations. The product of (1) the flow rate and (2) the difference between the supply and return temperatures is integrated. The apparatus includes a flow meter which provides an electrical output signal, two temperature sensors associated respectively with the supply and return pipes of the system, a differential amplifier and an integrator. An output signal from the flow meter is tapped off across an electrode gap extending substantially at right angles to the flow and to the magnetic field.

4 Claims, 2 Drawing Figures

PATENTED OCT 22 1974         3,842,669

APPARATUS FOR MEASURING QUANTITIES OF HEAT USED IN HOT-WATER HEATING INSTALLATIONS

The invention relates to apparatus for measuring quantities of heat used in hot-water heating installations by integrating of the product of the flow rate and the difference between the supply and return temperatures. The apparatus includes a flow-meter which provides an electrical output signal, two temperature sensors, and an integrator. One of the sensors is associated with the supply pipe and the other with the return pipe and, with the aid of which sensors, an electrical differantial signal corresponding approximately to the difference in temperature is produced.

In a known means for measuring amounts of heat, a flow-meter produces impulses in dependence upon the flow rate which trigger a bistable trigger device into a first condition. The temperature sensors used are temperature-responsive resistors which are connected to the inputs of a differential amplifier. The output voltage of the amplifier is converted into a frequency, with the aid of which the trigger device is triggered back to its other condition. The output from the trigger device is thus formed by impulses of variable duration which correspond to the product of the flow rate and the temperature-difference. These impulses are integrated with the aid of a synchronous motor which drives a counting unit.

Another electrically operated apparatus for measuring amounts of heat has a bridge circuit, one branch of which contains a temperature-responsive resistor associated with the supply, and another branch of which has a temperature-responsive resistor contained in an oil bath. Suspended in the oil bath is a helical tube through which some of the return water flows. As soon as the temperature of the oil drops, a relay contained in the diagonal of the bridge switches on a heating means in the oil bath. The thermal energy from the heating means is integrated in a counter as a measure of the quantity of heat consumed.

Also known are inductive flow-meters in which an electromagnet, fed with an energizing current, produces a magnetic field passing transversely through the flow, and in which the output signal can be tapped off as a voltage across an electrode gap disposed substantially at right angles to the flow and to the magnetic field.

The present invention seeks to provide an apparatus for measuring amounts of heat of the initially stated kind, which apparatus is simplified in that it dispenses with the use of essential switching components.

According to the invention, this object is achieved by the use of a known inductive flow-meter in which an electromagnet fed with an energizing current produces a magnetic field extending transversely through the flow and an output signal is tapped off across an electrode gap extending substantially at right angles to the flow and to the magnetic field. The energizing current is substantially proportional to the differential signal and the output signal passed to the integrator.

In this apparatus a separate stage for forming the product of the flow rate and the difference in temperature is not required because the output signal from the inductive flow-meter is not only proportional to the flow rate but also to the magnetic field and therefore to the energising current. If this is varied in dependence upon the difference in temperature, the required product is already available at the output of the flow-meter. The product can therefore be directly integrated and can, for example, be passed to a motor driving a counter.

It is particularly advantageous if the energizing current is taken from a differential amplifier, the control inputs of which are influenced by each of the temperature sensors. The differential amplifier is therefore used not only for forming the required difference, but it has in addition an amplification factor such that it provides the necessary energizing current.

Although the apparatus can also operate on direct current, it is preferred to use an alternating current as the energizing current and to employ an integrator fed with alternating current. The apparatus can then be powered by the normal A.C. supply and this is particularly advantageous in the case of measuring devices that are to be fitted for example in dwellings. Furthermore, very simple integrators can be used.

In one advantageous embodiment, the temperature sensors are temperature-responsive resistors which are fed with the same supply voltage as the differential amplifier. This arrangement can also optionally operate on direct current or alternating current.

In a further embodiment, the temperature sensors are thermocouple elements. The thermo-electric voltages produced by these are passed to the input of the differential amplifier.

Figure 2:
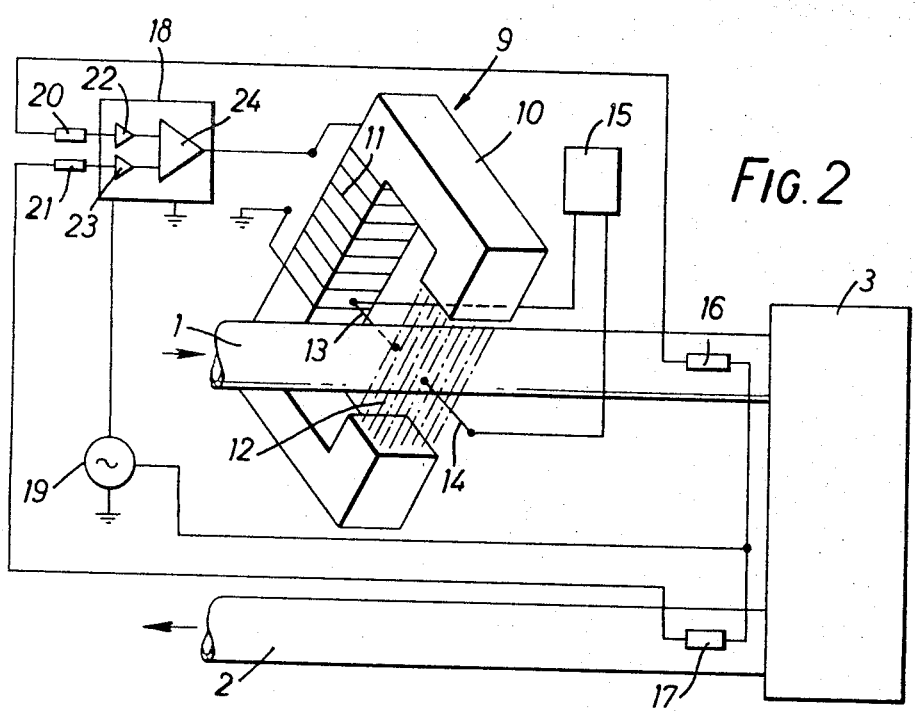

The invention will now be described in greater detail by reference to two preferred arrangements illustrated diagrammatically in the drawing, in which:

FIG. 1 shows apparatus in accordance with the invention and incorporating thermocouple elements as the temperature sensors, and FIG. 2 shows apparatus in accordance with the invention and incorporating temperature-responsive resistors as the temperature sensors.

Referring now to FIG. 1, a consumer unit 3 is connected to a heat-producing power station by way of a supply pipe 1 and a return pipe 2. Fitted in the supply pipe 1 is a first thermocouple element 4, and a second thermocouple element 5 is fitted in the return pipe 2. Each of the two thermocouple elements is connected to a control input of a differential amplifier 6, the supply voltage of which is taken from supply terminals 7 by way of a switch 8. The apparatus operates on A.C. voltage.

An inductive flow-meter 9 has a magnetic core 10 with an energizing coil 11 which is supplied with current from the output of the amplifier 6. The supply pipe 1 passes through the air-gap 12 of the magnetic core 10, in which gap is formed a magnetic field passing transversely through the flow in the supply pipe 1. Disposed at right angles to the plane defined by the supply pipe 1 and the magnetic field in the gap 12 is an electrode gap formed by two electrodes 13 and 14. The tips of the electrodes 13 and 14 project slightly into the flow.

If an energizing current, and therefore a magnetic field, is present, and water flows through the supply pipe 1, there is produced a voltage at the electrodes 13 and 14 that is proportional to the energizing current and the rate of flow. This voltage corresponding to the product of the difference in temperature and the flow rate is passed to an integrator 15, e.g., to a counter driven by a motor, or to an electrical induction counter, so that the amount of heat consumed during a period of time can be measured and read off.

In the embodiment shown in FIG. 2, the same reference numerals as in FIG. 1 are used for parts that are similar to those shown in that figure. In this case temperature-responsive resistors are used as the temperature sensors 16 and 17. Like the differential amplifier 18, the sensors are supplied from a common A.C. source 19. The control currents are passed to the inputs of the differential amplifier 18 through series resistors 20 and 21, and each of these currents is amplified in pre-amplifiers 22 and 23 before the difference is formed in the final amplifier 24. Here again the energizing current of the flow meter 9 is proportional to the difference in temperature, and the output signal from this meter 9 is therefore equal to the product of the difference in temperature and the flow rate.

The apparatus described can of course be modified in various ways known to the person skilled in the art. For example, the resistors 16 and 17 can be held at a higher temperature than the water by being heated, so that the cooling of these resistors can be used as a measure of the temperature. The arrangements described can also be supplied with direct current.

I claim:

1. Apparatus for measuring quantities of heat used in hot water heating installations comprising a unit for receiving heated water having an inlet and an outlet, inlet and outlet pipes connected to said inlet and outlet of said unit, a differential amplifier having an input and an output, two temperature sensors respectively in said pipes in the vicinities of said inlet and outlet and being electrically connected to said input of said amplifier, an inductive flow meter having an input coil and output means for providing an electrical output signal which comprises an electrode gap disposed at right angles to the fluid flow and magnetic field, said input coil of said flow meter being electrically connected to said output of said amplifier to provide a field strength for said meter proportional to the output current of said amplifier, and an integrator connected to said output means of said flow meter.

2. Apparatus according to claim 1 wherein said output current of said differential amplifier is an alternating energizing current which is supplied to said flow meter.

3. Apparatus according to claim 1 wherein said temperature sensors are temperature responsive resistors.

4. Apparatus according to claim 1 wherein said temperature sensors are thermocouple elements.

* * * * *